(12) United States Patent
Lecerf et al.

(10) Patent No.: US 7,720,607 B2
(45) Date of Patent: May 18, 2010

(54) METHOD FOR TREATING SEISMIC CUBES CORRESPONDING, FOR A COMMON ZONE ON THE GROUND, TO DIFFERENT SOURCE/RECEIVER AND/OR ANGLE OF INCIDENCE OFFSET VALUES

(75) Inventors: Didier Lecerf, Brentford (GB); Thierry Coleou, Massy (FR)

(73) Assignee: CGGVeritas Services SA, Massy (FR)

( * ) Notice: Subject to any disclaimer, the term of this patent is extended or adjusted under 35 U.S.C. 154(b) by 688 days.

(21) Appl. No.: 10/554,966

(22) PCT Filed: Apr. 28, 2004

(86) PCT No.: PCT/FR2004/001024

§ 371 (c)(1),
(2), (4) Date: Nov. 8, 2006

(87) PCT Pub. No.: WO2004/097457

PCT Pub. Date: Nov. 11, 2004

(65) Prior Publication Data

US 2007/0055465 A1 Mar. 8, 2007

(30) Foreign Application Priority Data

Apr. 28, 2003 (FR) .................................. 03 05161

(51) Int. Cl.
*G01V 1/50* (2006.01)
*G01V 1/00* (2006.01)
*G01V 1/28* (2006.01)
*G01V 1/30* (2006.01)
*G01V 1/48* (2006.01)
*G06F 17/40* (2006.01)
*G06F 19/00* (2006.01)

(52) U.S. Cl. .................. 702/11; 73/152.02; 175/50; 367/38; 702/14; 702/17

(58) Field of Classification Search .............. 73/152.01, 73/152.02, 152.16; 175/1, 40, 41, 50; 181/101, 181/108, 111, 112, 122, 123, 124; 324/323, 324/332, 334, 337, 344; 367/14, 25, 27, 367/28, 40, 43, 47, 48, 49, 59, 87, 37, 38; 702/1, 2, 6, 11, 14, 17, 127, 189, 190
See application file for complete search history.

(56) References Cited

U.S. PATENT DOCUMENTS 2,977,680 A * 4/1961 Halverson .................. 33/1 HH
3,163,750 A * 12/1964 Lindsey et al. .............. 708/813

(Continued)

OTHER PUBLICATIONS

Hall, S.A. et al, "AVOA Attribute Analysis and Cross-Plotting for Time-Lapse . . . .", SEG Int'l Exposition, San Antonio, TX, Sep. 9-14, 2001, XP002269339.

(Continued)

*Primary Examiner*—Edward R Cosimano
(74) *Attorney, Agent, or Firm*—Strasburger & Price, LLP

(57) ABSTRACT

Method for processing a set of seismic cubes corresponding to the same acquisition zone and at different source/receiver offset and/or angle of incidence values, characterized in that at least one seismic cube is determined, which is an estimation of the component common to at least two seismic cubes corresponding to different offset and/or angle of incidence values.

21 Claims, 5 Drawing Sheets

Common Cube

Cube (A- Common)
+ Noise A

Cube (Common - B)
+ Noise B

U.S. PATENT DOCUMENTS

| | | | | |
|---|---|---|---|---|
| 3,341,809 A | * | 9/1967 | Sterry | 367/40 |
| 3,381,266 A | * | 4/1968 | Harris | 367/50 |
| 5,784,334 A | * | 7/1998 | Sena et al. | 367/47 |
| 6,041,018 A | | 3/2000 | Roche | |
| 6,678,617 B2 | * | 1/2004 | Khan | 702/16 |
| 6,681,184 B2 | * | 1/2004 | Jenner et al. | 702/14 |
| 6,898,147 B2 | * | 5/2005 | Jenner et al. | 367/51 |
| 7,020,558 B2 | * | 3/2006 | Voutay et al. | 702/16 |
| 7,337,070 B2 | * | 2/2008 | Lecerf | 702/17 |
| 7,373,251 B2 | * | 5/2008 | Hamman et al. | 702/14 |
| 2003/0018435 A1 | * | 1/2003 | Jenner et al. | 702/14 |
| 2003/0043693 A1 | | 3/2003 | Eastwood et al. | |
| 2004/0109387 A1 | * | 6/2004 | Jenner et al. | 367/14 |
| 2005/0209895 A1 | * | 9/2005 | Coleou | 705/5 |
| 2006/0136162 A1 | * | 6/2006 | Hamman et al. | 702/104 |
| 2006/0235620 A1 | * | 10/2006 | Lecerf | 702/14 |
| 2006/0247860 A1 | * | 11/2006 | Angerer et al. | 702/14 |
| 2007/0041271 A1 | * | 2/2007 | Lecerf | 367/15 |

OTHER PUBLICATIONS

Coleou, T. et al, "Multivariate Geostatistical Filtering of Time-Lapse Seismic Data . . . ", SEG Int'l Exposition, Salt Lake City, UT, Oct. 6-11, 2002, XP002269218.

* cited by examiner

METHOD FOR TREATING SEISMIC CUBES CORRESPONDING, FOR A COMMON ZONE ON THE GROUND, TO DIFFERENT SOURCE/RECEIVER AND/OR ANGLE OF INCIDENCE OFFSET VALUES

GENERAL TECHNICAL FIELD

This invention relates to seismic analysis.

It is conventional in 3D seismic analysis to analyse seismic cubes corresponding, for the same ground zone, to different source/receiver offsets or to different angle of incidence values.

"Seismic cube" in this context and throughout the text refers to any collection of seismic traces in which each seismic trace is associated with a given position in the ground zone on which the acquisition has been performed.

It is common, in the context of AVO ("Amplitude versus Offset") or AVA ("Amplitude Variation with Angle of Incidence") processing operations, to compare corresponding data cubes with different offset values.

In general, as shown in FIG. 1, variations are detected by subtracting two seismic data cubes corresponding to two offset values.

However, when the difference in terms of seismic signal is of low amplitude, the physical properties to be identified can easily be masked by artifacts such as, for example, noise due to the imperfect seismic data acquisition geometry.

The random and unrepeatable nature of the noise of each acquisition means that, as shown in FIG. 2, the simple subtraction of the seismic data increases the noise level with respect to the signal sought. In FIG. 2, the noise is diagrammed with horizontal lines (cube A) and vertical lines (cube B) which overlap on the subtracted cube (cube A-B). In addition, the overlapping of the respective noises destroys their statistical spatial organisations (if they exist) and therefore makes it more difficult to filter them.

Moreover, the "AVO" and "AVA" processing operations make it possible to determine, according to the source/receiver offset or according to the angle of incidence, a number of attributes such as, in particular, the reflectivity coefficients and the acoustic impedances.

However, these AVO or AVA attributes are particularly sensitive to noise since they are obtained by regression.

DESCRIPTION OF THE INVENTION

An aim of the invention is to propose a new technique that enables the disadvantages of the prior art to be overcome.

The proposed technique in particular makes it possible to determine, on the basis of at least two seismic cubes corresponding to different source/receiver offset and/or angle of incidence values, new seismic cubes capable of showing data that would, as the case may be, be more difficult to show by means of conventional techniques.

Another aim of the invention is also to propose a processing operation making it possible to filter seismic cubes corresponding to different offset values, so as to deduce at least one cube particularly immune from noise and therefore particularly suitable notably for AVO or AVA processing.

Thus, the invention proposes a method for processing a set of seismic cubes corresponding to the same acquisition zone and to different source/receiver offset and/or angle of incidence values, characterised in that at least one seismic cube is determined, which is an estimation of the component common to at least two seismic cubes corresponding to different offset and/or angle of incidence values.

The common cube thus determined bears information that is substantially equivalent to a filtered "sum".

In addition, unlike the simple subtraction between existing cubes, as performed in the prior art, this common cube is advantageously used as a reference cube for showing amplitude variations over the different cubes that correspond to the different offset and/or angle of incidence values.

Thus, this common component estimation is subtracted from at least one of the two initial cubes.

In this way, one has differential cubes that have been determined without the noise of the two initial cubes overlapping.

In addition, these differential seismic cubes can easily be filtered since the statistical spatial organisation has not been destroyed by the overlapping of noises.

Moreover, and equally advantageously, in order to perform a filtering operation on a set of seismic cubes corresponding to the same acquisition zone and to different source/receiver offset and/or angle of incidence values, at least one seismic cube is determined which is an estimation of the component common to at least two cubes corresponding to successive source/receiver offset and/or angle of incidence values.

Advantageously, in particular, this common cube is associated, in a new set of seismic cubes, with an offset and/or angle of incidence value between one and the other of the two successive values which correspond to the two cubes from which an estimation of the common component is determined, and a processing operation is implemented on the new set of seismic cubes thus constituted in order to determine at least one data item relating to the geology of the subsurface of the zone on which the seismic acquisition campaign has been implemented.

In addition, the invention proposes a method for processing two sets of seismic cubes from two acquisition campaigns performed for the same zone on the ground at two different times, characterised in that, for each offset and/or angle of incidence value, an estimation is determined of a seismic cube corresponding to the component common to the two seismic cubes that correspond to said offset and/or angle of incidence value, as well is an estimation of residual components, and in that on the set of residual cubes thus obtained for each of the two acquisition campaigns, a filtering method as described above is implemented.

Different seismic cubes can then be determined using the filtered cubes thus obtained.

In particular, it is possible to determine a seismic cube that is the sum, on all of the offset and/or angle of incidence values, of the differences of filtered residual cubes corresponding to one and to the other of the two acquisition campaigns.

In addition, for at least one of the acquisition campaigns, a seismic cube is determined which is the sum, on all of the offset and/or angle of incidence values, of the seismic cubes that correspond to the components common to the two acquisition campaigns and the filtered residual cubes corresponding to said acquisition campaign.

Moreover, for at least one of the acquisition campaigns, a filtered seismic cube is determined for each offset and/or angle of incidence value, which cube is the sum of the cube that corresponds to the component common to the two acquisition campaigns for said offset and/or angle of incidence value and a residual cube which is a function of one or more filtered residual cube(s) determined for the offset and/or angle of incidence value and at least one adjacent offset and/or angle of incidence value.

Other features and advantages of the invention will become more clear from the following description, which is purely illustrative and non-limiting.

DESCRIPTION OF ONE OR MORE EMBODIMENTS

General Example

Two seismic data cubes (data A and data B) obtained from one or more acquisitions made for the same ground zone and corresponding to two offset and/or angle of incidence values are considered.

The data corresponding to these two cubes can be broken down as follows:

data $A$=common part+noise $A$ data $B$=common part+noise $B+\Delta$ where $\Delta$ represents the seismic data variations and where the common part is defined as the coherent or invariant part of data A and B.

In a first step, an estimation of this common part is determined.

Various methods can be used to this end.

In particular, this estimation can be calculated by cokriging, by cross-correlation or by averaging.

In particular, this estimated common part represents information that has remained identical between the two offset and/or angle of incidence values.

It has the advantage of presenting a better signal-to-noise ratio than the initial data.

In a second step, the two following partial differences are determined:

Diff$A$=data $A$−estimated common part

Diff$B$=estimated common part−data $B$

Figure 1:
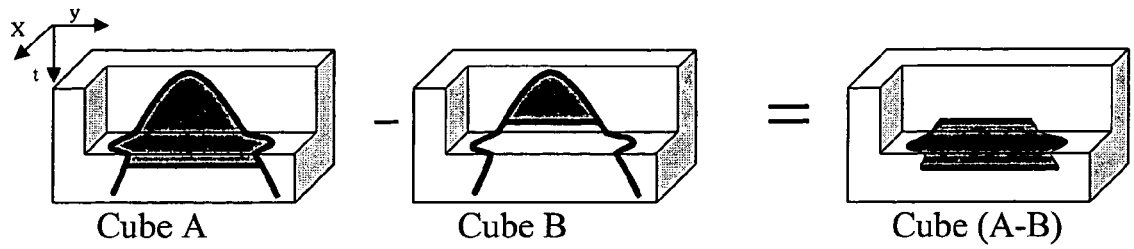
FIG. 1 is a diagrammatic view showing a conventional processing operation by subtraction of seismic cubes.
Figure 2:
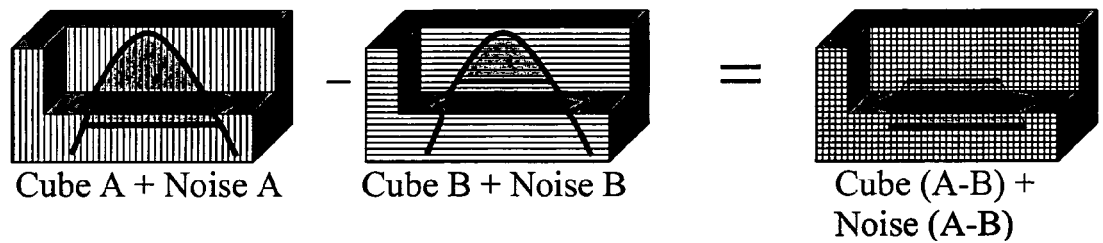
FIG. 2 is a diagrammatic view showing that the subtraction of noisy cubes only increases the level of noise with respect to the variations being demonstrated.
Figure 3:
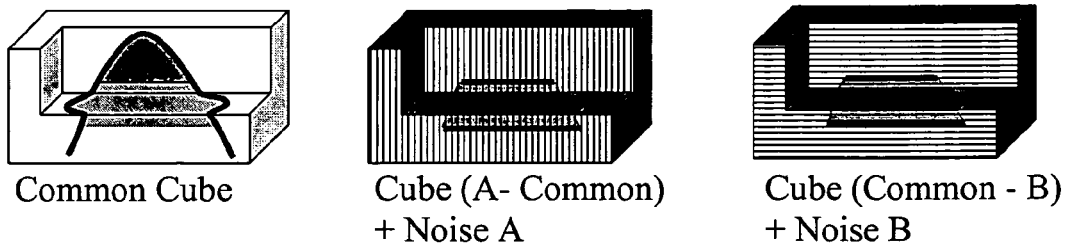
FIG. 3 is a diagrammatic view showing the determination of a common cube and the determination, from this common cube, of difference cubes.

FIG. 3 shows the common component cube and the partial difference cubes (differential cubes) thus obtained.

The two partial differences enable the changes for each offset or incidence value to be revealed They verify:

Diff$A$=noise $A-\alpha.\Delta$

Diff$B$=−noise $B-(1-\alpha)\Delta$ where $\alpha$ is the ratio of distribution of the residual signal, which is often close to 0.5 but may vary spatially. (It may also be dependent on the signal-to-noise of each initial cube).

The signal-to-noise ratio of these two partial differences is thus $\alpha.\Delta$/noise A for Diff A and $(1-\alpha)\Delta$/noise B for Diff B.

Next, a filtering process is performed on the partial differences thus obtained, which is possible since the statistical spatial organisations are preserved and in particular have not been suppressed by the overlapping of noises, and the noise of each data set preserves its initial intrinsic properties, such as its statistical spatial coherence.

The independent filtering for each partial difference can be performed, for example, implemented is, by a deterministic spatial filter in the KxKy domain or a statistical filter by factorial cokriging or even a smoothing function along a particular axis enabling the acquisition noises to be attenuated. The spatial orientation of the noise is easier to determine with statistical measurements (2D/3D variograms) given that the common part containing the majority of the seismic signal of the geological zone has been subtracted.

After filtering, it is possible to reconstruct the total difference from the two filtered partial differences thus obtained:

data $A$−data $B$=Diff$A$+Diff$B$

It is understood that the summing of the partial differences after filtering thereof provides a better signal-to-noise ratio than what is obtained by calculating the total difference by subtraction of data A and data B.

It is noted that there is no loss of information since the sum of the partial differences is equal to the total difference.

In addition, it is noted that if the noise level is different between the initial data A and B, one of the two partial differences has a better signal-to-noise ratio than the total difference.

In some cases, the information will be more apparent on a cube corresponding to a partial difference than on the cube corresponding to the total difference.

Calculation of the Common Part

Principle

Figure 4:
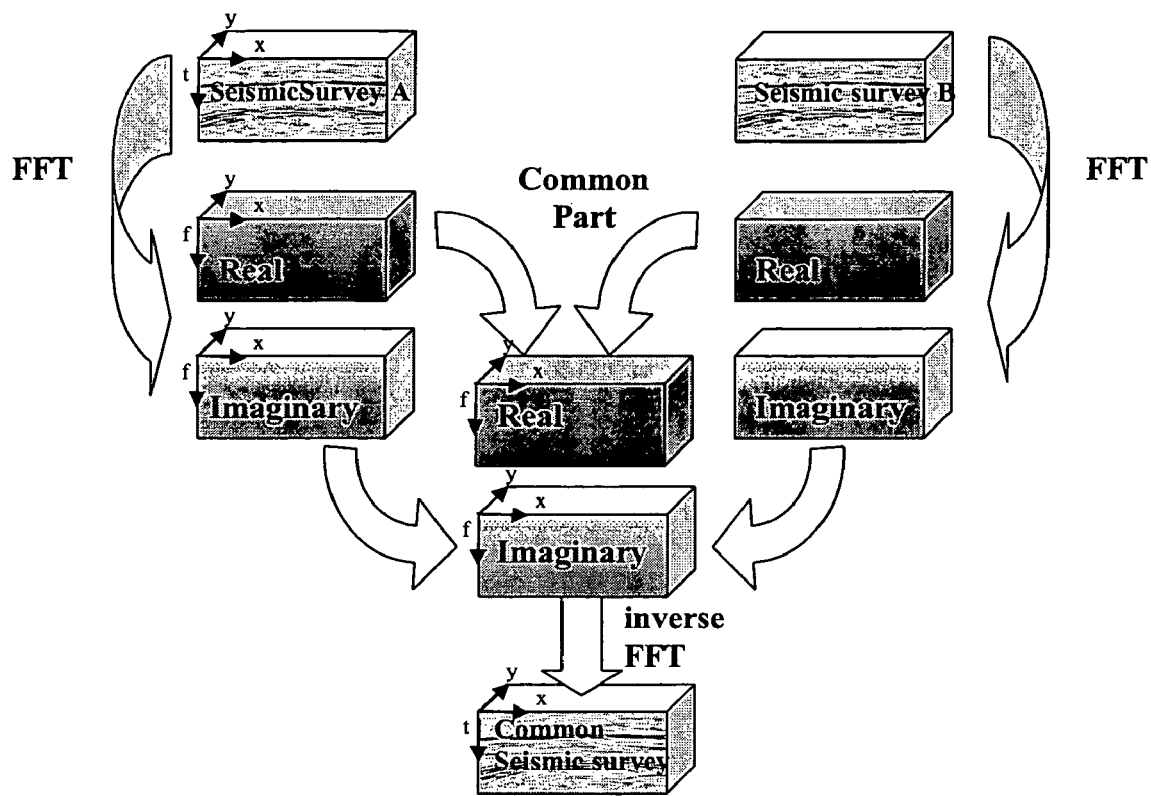
FIG. 4 shows a possible embodiment for determining an estimation of the part common to two seismic cubes.

FIG. 4 shows an example of a calculation of the common part using the automatic spatial factorial cokriging (or automatic multivariable kriging analysis) in the frequency domain.

The initial time data is transformed by FFT into cubes of real parts and imaginary parts in the frequency domain (Fourier domain).

The common part of each real and imaginary frequency plane is calculated by the so-called "automatic factorial cokriging" method with a 2D operator in the plane (x, y).

By the process of inverse Fourier transform of the common cube of the real parts and the common cube of the imaginary parts, the common time cube of the seismic data is thus obtained.

Detailed Example

A more detailed example, of the processing is provided below:

1) In a first step, the data corresponding to the two collections of traces (cube A and cube B) to be processed is read. This data is recorded in a file in which each trace is identified by a line number and a column number that correspond to a ground position.

2) In a second step, a time window is selected in order to define on the seismic traces the time interval taken into consideration for the processing. As necessary, the portions of traces thus selected are completed with null values so as to obtain, for each trace, a number of samples corresponding to a power of 2, 3, 5 so as to enable the FFT processing according to the FFT functions.

3) In a third step, a fast Fourier transform (FFT) is applied to the series of samples corresponding to each of the traces and to the time window selected.

Thus, four cubes with a frequency corresponding to the real part and the imaginary part of each selection of cubes A and B are obtained.

4) For each frequency plane, two maps (2D), one corresponding to, the cube A data and the other corresponding to the cube B data, are constructed in the real domain and in the imaginary domain.

Then, an automatic factorial cokriging processing operation is applied to the maps thus obtained for the data A and B cubes so as to obtain a map common to the two initial maps.

Summaries of the factorial cokriging are provided in Appendix I at the end of the description.

The factorial cokriging processing operation is performed independently with the real parts and with the imaginary parts.

This processing operation comprises, for example, in each of these two domains, the following steps:

According to a given variogram radius, the calculation of a 2D variogram for the map corresponding to data A and for the map corresponding to data B; calculation of a cross-variogram.

Construction of covariance and cross-covariance matrices based on the 3 variograms thus obtained.

Resolution of the factorial cokriging system which corresponds to these matrices, so as to deduce a spatial operator, i.e. according to the line and column position of the sample in question on the mapping. To stabilise the inversion of system matrix, a constant that corresponds to a very small percentage of the square root of the product of the two variances is added to the diagonal of the covariance matrices.

The spatial operator thus obtained with the initial maps is then convoluted to obtain the common part of the two maps. 5) The processing operation described above is repeated for each frequency plane of the real and imaginary parts. Two cubes are obtained, one for the common real parts and the other for the common imaginary parts.

6) Once all of the frequency planes have been calculated, an inverse Fourier transform of the common complex cubes is implemented in order to obtain a cube in common seismic time.

Examples of Alternative Embodiments

Other embodiments can of course be considered.

Processing Mask

Figure 5:
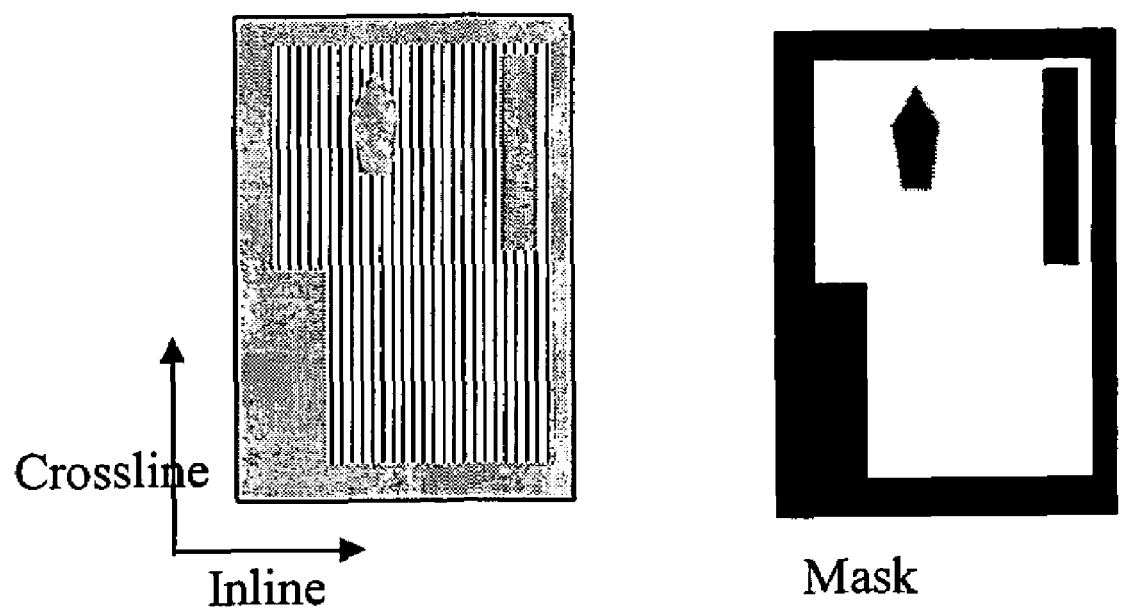
FIG. 5 shows an example of a mask applied to the 2D maps

As shown in FIG. 5, the calculation of the operator can be limited to precise regions corresponding to valid data. The variograms and cross-variogram are thus calculated on the regions defined by the mask. The mask can, for example, hide a zone without data due to a drilling platform or data with significant noise due to edge effects. The use of a mask will improve the quality of the operator and therefore of the noise filtering. The mask is defined with valid values in white 1 and non-valid values in black 0.

Double Iteration

Figure 6:
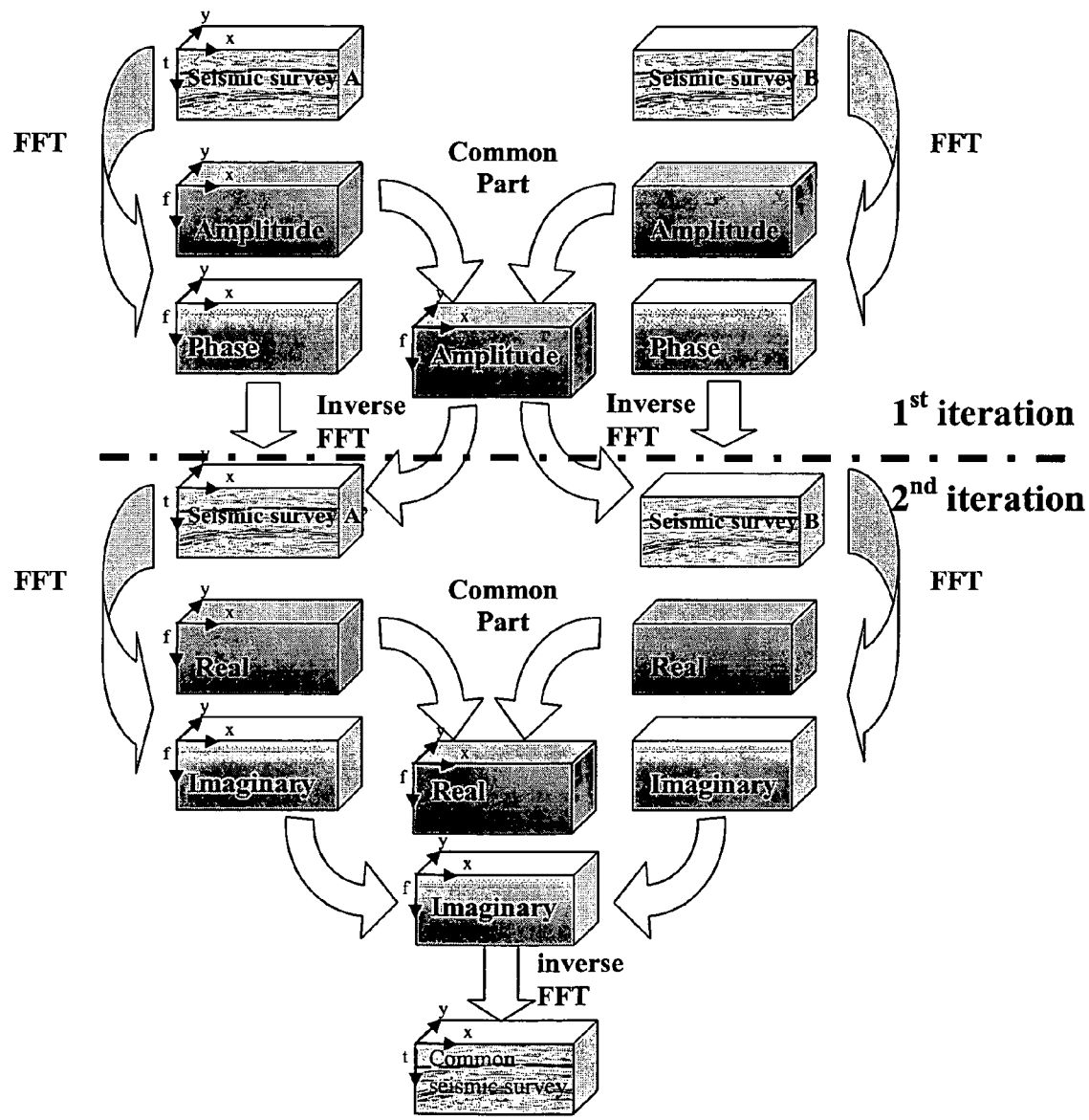
FIG. 6 shows another possible embodiment with a plurality of iterations.

In addition, when the frequency content of the signal between cubes A and B is very different, it is sometimes advantageous to perform the calculation of the common cube in two iterations: (FIG. 6).

The first iteration consists of calculating a common amplitude spectrum.

To this end, for each frequency plane, an amplitude map as well as a phase map are determined from maps of real and imaginary parts. Then, on the basis of the amplitude maps thus determined for the data A and the data B for each frequency, a common map of spectral amplitude is determined. This map is appropriately determined by automatic factorial cokriging.

The real and imaginary part of A and B is then reformulated with the common amplitude thus obtained and the initial phase of A and B. After an inverse FFT processing of the cubes, two seismic cubes A' and B' having the same frequency content are obtained.

These two cubes are then processed with a second iteration.

The second iteration calculates the common real and imaginary part of A' and B'. In fact, it will set the common phase of the two seismic cubes A' and B' since the amplitude spectrum is already common after the first iteration.

Next, the common part is determined as previously described in reference to FIG. 4.

Figure 7:
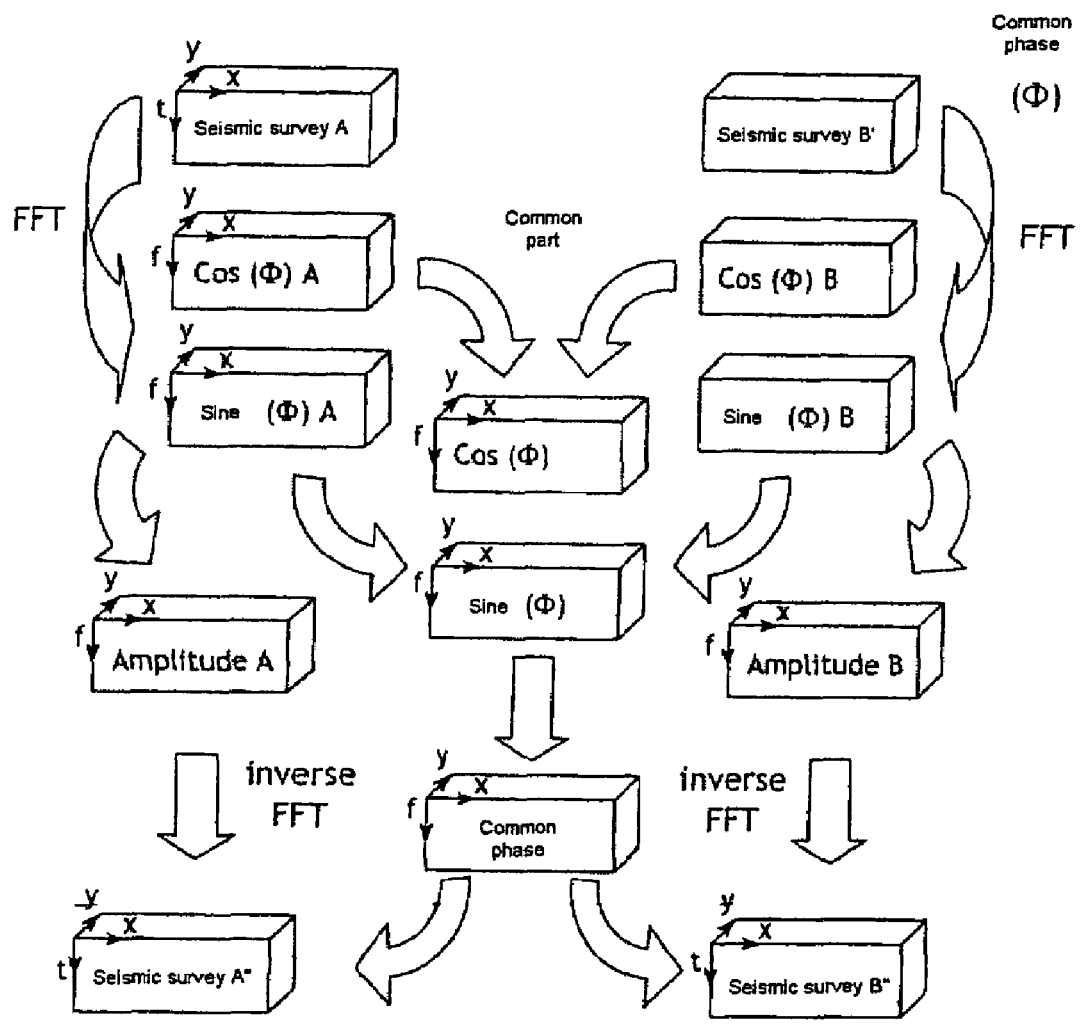
FIG. 7 shows another possible embodiment for calculating two cubes with a common phase.

Another possible alternative embodiment is shown in FIG. 7.

This alternative embodiment involves the extraction of cubes of amplitude associated respectively with cube A and cube B.

Simultaneously, or in a second step, the real and imaginary parts of cubes A and B, cubes corresponding to the cosine and the sine of the data phase, are shown.

Next, cubes of which one corresponds to the common part of the cosine cubes and the other corresponds to the common part of the sine cubes are determined.

Then, a cube of which the data constitutes the ratio of the sine cube and the cosine cube data thus obtained is determined: one thus has a cube giving the common part of the phase.

This common phase cube is combined with the two amplitude cubes initially extracted from cubes A and B so as to deduce the filtered cubes A' and B'.

These two cubes of filtered data can themselves be the subject of the second iteration described in reference to FIG. 5.

In another alternative, it is possible to calculate the cube common to the data cubes A and B by combining the cube of the common phase part and the cube of the common amplitude part.

Processing Operations Other than 2D Factorial Cokriging

Other processing operations for estimating the common part, and in particular processing operations implementing a factorial cokriging, can be considered.

In particular, it is possible to determine a common part directly in the time domain on a series of maps (x, y) of seismic amplitude (or other data).

For each time considered, the part common to the two mappings that correspond to this time is determined by implementing an automatic factorial cokriging processing operation.

In addition, the processing can use 3D operators instead of 2D operators. The automatic factorial cokriging processing operation is indeed generalised with a three-dimensional covariance matrix.

It should be noted that the use of 2D operators (x, y) (or 3D as necessary) makes this a very high-performing method for filtering spatially organised noises.

Of course, it is also possible to determine parts common to more than two cubes, by calculating for example, common parts of common parts. In this way, the proposed method can be extended to more than two cubes.

Processing of Cubes Corresponding to Successive Offset and/or Angle of Incidence Values We return again to the case in which there is initially a plurality of seismic cubes corresponding, for the same ground zone, to a plurality of different source/receiver offsets (or to a plurality of angle of incidence values).

In the text below, $S_i$ designates the collection of seismic traces corresponding to the ith offset, where i is a dummy index.

These different collections of seismic traces are processed two-by-two in order to determine the parts common to the collections corresponding to two successive offset values.

Thus, for the series $S_i$ and $S_{i+1}$, where $i \in \{1, \ldots, M-1\}$, with M being the number of collections of traces, a common part $C_{i,i+1}$ and residual parts $R_i$ and $R_{i+1}$ are determined, which verify:

$$S_i = C_{i,i+1} + R_i$$

$$S_{i+1} = C_{i,i+1} + R_{i+1}$$

In this case as well, it is possible to consider different methods for decomposition into common parts and residual parts.

A decomposition technique that can be implemented consists of sampling the seismic traces in order to transform each collection of traces into a series of 2D mappings. Each map, for example, consists of amplitudes of seismic traces for a given sampling time, according to the ground position (which is given for example by reference to a frame defined by two axes).

The 2D maps obtained for two collections of successive seismic traces Si, Si+1 and for a given sampling time are processed by factorial cokriging in order to deduce a common map and residual maps All of the common maps thus obtained enable the collection of common traces to be reconstructed.

Similarly, all of the residual maps constitute the collections of residual traces.

It should be noted that the collections of traces $C_{i,i+1}$ thus obtained constitute noise-corrected collections.

The residual data $R_i$ or $R_{i+1}$ that is suppressed indeed corresponds to the unrepeatable component of the data between two successive offsets, which in particular includes the organised noise, since it cannot be repeated from one offset to another.

The collections of traces $C_{i,\,i+1}$ are then particularly suitable for the implementation of conventional AVO or AVA processing operations.

In particular, a given collection $C_{i,\,i+1}$ can be associated with an offset value between the offset values i and i+1 which correspond to the successive collections from which they have been calculated.

One then has a new set of seismic trace collections corresponding to a plurality of source/receiver offset values which are, as the case may be, partially or completely stacked or from which AVO or AVA attribute maps are determined.

The AVO or AVA processing operations per se are conventionally known. For an example of such a processing operation, reference can advantageously be made to the following publication.

It should be noted that as the AVO or AVA processing operations take into account a plurality of successive collections, the possible loss of a signal during the determination of the common part is compensated by the particularly significant reduction in organised noise made possible by estimating the common part.

The AVO or AVA attributes thus obtained are all the more reliable.

Processing Limited to Specific Collections and Offset Values

In another alternative embodiment, the filtering process described above is implemented only on collections of traces that have a particularly significant noise.

Among the different collections of traces existing for a plurality of offset values, the noisiest are identified, and, for each of these collections, at least one collection of traces is calculated, corresponding to the component common to the collection in question and to the collection corresponding to the offset value that immediately precedes or immediately follows it.

Next, to perform an AVO or AVA processing operation, a set of trace collections is used, consisting of collections of initial traces that have not been as in the noisiest, and collections of common predetermined traces corresponding to new offset values.

In this case, the collection of traces on which the AVO or AVA processing operation is implemented do not correspond to a regular offset value.

4D Application

We refer next to the case in which there are two sets $S_{Ai}$, $S_{Bi}$ of collections of seismic traces from two acquisition campaigns A and B performed for the same ground zone at two times.

For each offset i, a common component collection Ci and residual component collections RAi, RBi are calculated:

$$S_{Ai} = C_i + R_{Ai}$$

$$S_{Bi} = C_i + R_{Bi}$$

with $i \in \{1, \ldots, M\}$ and M number of collections for each campaign.

Next, a filtering process as described above for the 3D application is implemented on the sets of residual trace collections RAi and RBi thus obtained.

In particular, the following are calculated:

collections of traces KAi, Ai+1 (KBi, Bi+1) corresponding to the common parts of collections RAi (Rbi) corresponding to successive offsets i, i+1, as well as collections of traces corresponding to the unrepeatable residual parts MAi, MBi, so that $$R_{Ai} = K_{Ai,Ai+1} + M_{Ai}$$

$$R_{Bi} = K_{i,Bi+1} + M_{Bi}$$

One then has a number of collections of traces that are also signatures of the evolution of the subsurface between two acquisitions.

4D different on the original traces: $\Sigma_1^M (S_{Ai} - S_{Bi})$ or $\Sigma_1^{M1}(R_{Ai} - R_{Bi})$ 4D filtered difference: $\Sigma_1^{M-1}(K_{Ai,Ai+1} - K_{Bi,Bi+1})$ Filtered sum: $\Sigma_1^{N-1} K_{Ai,Ai+1} + \Sigma_1^N C_i$ and $\Sigma_1^{N-1} K_{Bi,Bi+1} + \Sigma_1^N C_i$ Collections of filtered traces:

$C_1 + (K_{A1,A2})/2$ and $C_1 + (K_{B1,B2})/2$ for the first offset $C_i + (K_{Ai-1,Ai} + K_{Ai,Ai+1})/2$ and $C_i + (K_{Bi-1,Bi} + K_{Bi,Bi+1})/2$ $i \in \{2, \ldots, M-1\}$ $C_M + (K_{AM-1,AM})/2$ and $C_M + (K_{BM-1,BM})/2$ for the last offset.

Appendix I—Summary of Factorial Cokriging

An example of obtaining a common map by factorial cokriging is described below. Z1 and Z2 designate the two functions corresponding to these two maps A first step involves calculating the cross-variogram of these two functions, of which the values are:

$$\gamma_{12}(h) = \frac{1}{N} \sum (Z1(x) - Z1(x+h))(Z2(x) - Z2(x+h))$$

where x and x+h designate the pairs of points taken into consideration according to the direction and for the distance h for which the value of the variogram is determined, and where N is the number of these pairs of points for this direction and this distance.

Knowing this cross-variogram, it is possible then to determine an estimation of the function that corresponds to it, which verifies:

$$Z^*_{12}(x) = \Sigma \lambda_\alpha^1 Z_\alpha^1 + \Sigma \lambda_\beta^1 Z_\beta^2$$

where $\alpha$ and $\beta$_ are two dummy indices designating the points considered around point x for which an estimation of said function is to be determined, with $Z_\alpha^1$ and $Z_\beta^2$ being the value of said point x, N being the number of these points and where $\lambda_\alpha^1$ and $\lambda_\beta^2$ are weighting coefficients.

These weighting coefficients $\lambda_\alpha^1$ and $\lambda_\beta^2$ are determined by inversion of the cokriging equation:

$$\begin{bmatrix} C_{11}11 & \cdots & C_{11}N1 & C_{12}11 & \cdots & C_{12}11 \\ \cdots & \cdots & \cdots & \cdots & \cdots & \cdots \\ C_{11}1N & \cdots & C_{11}NN & C_{12}11 & \cdots & C_{12}NN \\ C_{21}11 & \cdots & C_{21}N1 & C_{22}11 & \cdots & C_{22}N1 \\ \cdots & \cdots & \cdots & \cdots & \cdots & \cdots \\ C_{21}1N & \cdots & C_{21}NN & C_{22}11 & \cdots & C_{22}NN \end{bmatrix} \begin{bmatrix} \lambda_{11} \\ \cdots \\ \lambda_{1N} \\ \lambda_{21} \\ \cdots \\ \lambda_{2N} \end{bmatrix} = \begin{bmatrix} C_{12}1X \\ \cdots \\ C_{12}NX \\ C_{12}1X \\ \cdots \\ C_{12}NX \end{bmatrix}$$

where the coefficients C12_ and C21_ are cross variance values of functions Z1 and Z2 at the points corresponding to indices _ and _ where the coefficients C11_ and C22_ are the covariance values respectively of function Z1 and function Z2 at said points. The index X corresponds to the point previously designated by x.

It is noted that the matrix that appears in this equation has the advantage of being inversible under certain calculation conditions.

In this way, by using the experimental covariances, the two variables corresponding to the two initial data series are broken down into a common component and two orthogonal residual components. The regularity of the data means that the experimental covariance is known for all of the distances used. No interpolation is necessary, and the matrix is defined as positive.

The function thus obtained is an estimation of the component common to the two data series constituted by the two maps.

The invention claimed is:

1. Method for processing a set of seismic cubes each seismic cube corresponding to a gather of seismic traces in which each seismic trace is a time-dependant amplitude signal and is associated with a given position on the around zone over which the acquisition has been carried out, said seismic cubes corresponding to the same acquisition zone and at different source/receiver offset and/or angle of incidence values, wherein at least one seismic cube is determined, which is an estimation of the component common to at least two seismic cubes corresponding to different offset and/or angle of incidence values, said estimate of the component common to at least two seismic cubes being defined as a coherent or invariant part of the seismic cubes.

2. Method according to claim 1, characterised in that, in order to determine a cube that is an estimation of a component common to at least two cubes:
   each of these cubes is converted in the frequency domain so as to deduce, for each of them, an amplitude cube as well as a cube corresponding to its real part and a cube corresponding to its imaginary part,
   cosine and sine cubes are extracted from the cubes corresponding to the real part and cubes corresponding to the imaginary part, an estimation of the part common to the cosine cubes and an estimation of the sine cubes are calculated,
   a common phase data cube is deduced from the cubes of common parts thus calculated.

3. Method according to claim 1, characterised in that this estimation of the common component is subtracted from at least one of the two initial cubes.

4. Method according to claim 3, characterised in that a filtering process is performed on a differential cube thus obtained.

5. Method according to claim 3, characterised in that the cube that corresponds to the estimation of the common component of the two initial cubes is subtracted from one and the other of said cubes, in that a filtering process is performed on one and the other of the two differential cubes thus obtained and in that these filtered differential cubes are subtracted or summed to reconstruct an estimation of the difference between the two initial cubes.

6. Method according to claim 1, characterised in that, in order to determine a cube that is an estimation of a component common to at least two cubes:
   each of these cubes is converted in the frequency domain to deduce, for each of them, an amplitude cube and a phase cube,
   an estimation of the part common to the amplitude cubes thus obtained is calculated.

7. Method according to claim 6, characterised in that:
   in the time domain, the amplitude cube thus obtained is convened by associating it respectively with the different phase cubes,
   in the frequency domain, each of the cubes thus obtained is converted in the time domain so as to obtain, for each of the cubes, a real cube and an imaginary cube,
   a cube that is an estimation of the component common to the real cubes and a cube that is an estimation of the component common to the imaginary cubes is calculated, and
   in the time domain, the two cubes, one real and the other imaginary, thus obtained, are converted.

8. Method according to claim 7, characterised in that:
   in the frequency domain, each of the cubes thus obtained in the time domain is converted so as to obtain, for each of these cubes, a real cube and an imaginary cube,
   a cube that is an estimation of the component common to the real cubes and a cube that is an estimation of the component common to the imaginary cubes are calculated, and
   in the time domain, the two cubes, one real and the other imaginary, thus obtained arc converted.

9. Method according to claim 1, characterised in that, to determine a cube that is an estimation of a component common to at least two seismic cubes:

each of these two seismic cubes is converted in the frequency domain to obtain, for each of them, a real cube and an imaginary cube, a seismic cube that is an estimation of the component common to the real cubes thus obtained, and a cube that is an estimation of the component common to the two imaginary cubes thus obtained, are calculated, and the two cubes, one real and the other imaginary, thus obtained, are converted in the time domain.

10. Method according to claim 9, characterised in that, in order to calculate a cube that is an estimation of a component common to at least two seismic cubes, a factorial cokriging processing operation is implemented.

11. Method according to claim 10, characterised in that, in order to calculate a cube that is an estimation of a component common to at least two seismic cubes:

each of the seismic cubes is sampled so as to deduce, for each of them, a series of 2D maps for each pair of 2D maps thus obtained, covariance and cross-variance matrices are determined, corresponding to the variograms of one and the other of these two maps, as well as to their cross-variogram, a factorial cokriging system that corresponds to these matrices is resolved in order to deduce a spatial operator to be applied to the two 2D map that corresponds to their common component, wherein all of the 2D maps thus obtained enable the common seismic cube to be reconstructed.

12. Method according to claim 11, characterised in that, in order to determine the cokriging system to be solved in order to deduce the spatial operator to be applied to two 2D maps, a mask is applied to the data of at least one of the two maps, prior to the determination of the covariances and cross-variances, which mask is intended to cancel the data of said map over a certain area.

13. Method for filtering a set of seismic cubes that correspond, for at least a seismic acquisition campaign in a given zone, to different source receiver offset and/or angle of incidence values, characterised in that at least one seismic cube is determined, which is an estimation of the component common to at least two seismic cubes corresponding to successive source/receiver offset and/or angle of incidence values.

14. Method according to claim 13, characterised in that the common cube is associated, in a new set of seismic cubes, to an offset and/or angles of incidence values between one and the other of the two successive values corresponding to the two cubes from which an estimation of the common component is determined and, on the new set of seismic cubes thus constituted, a processing operation is implemented in order to determine at least one data item relating to the geology of the subsurface of the zone on which the seismic acquisition campaign has been implemented.

15. Method according to claim 14, characterised in that a processing operation is implemented on said new set of seismic cubes in order to determine AVO or AVA attributes.

16. Method according to claim 14, characterised in that the set of initial cubes is processed in order to determine, for each pair of successive offset and/or angle of incidence values, a seismic cube that is an estimation of the component common to the seismic cubes corresponding to these two offset and/or angle of incidence values, wherein the set of common cubes thus obtained constitutes a new set of seismic cubes on which a processing operation is implemented in order to determine at least one data item relating to the geology of the subsurface.

17. Method according to claim 14, characterised in that, for the set of initial cubes, apparently noisy seismic cubes are selected, and, for each of these cubes, at least one seismic cube is determined, which is an estimation of the component common to this cube and to a cube corresponding to an immediately adjacent offset and/or angle of incidence value, wherein the cubes thus determined, as well as the other initial cubes constitute a new set of seismic cubes on which a processing operation is implemented in order to determine at least one data item relating to the geology of the subsurface.

18. Method for processing two seismic cubes from two acquisition campaigns performed for the same ground zone at two different times, each seismic cube corresponding to a gather of seismic traces in which each seismic trace is a time-dependent amplitude signal and is associated with a given position on the ground zone over which the acquisition has been carried out, wherein for each offset and/or angle of incidence value, it involves determining an estimation of a cube corresponding to the component common to the two cubes that correspond to said offset and/or angle of incidence value, as well as an estimation of residual cubes, and, wherein a filtering process according to claim 13, is implemented on the sets of residual cubes thus obtained, for each of the two acquisition campaigns, said estimate of the component common to at least two seismic cubes being defined as a coherent or invariant part of the seismic cubes.

19. Method according to claim 18, characterised in that it consists of determining a cube that is the sum, for all of the offset and/or angle of incidence values, of the differences of the filtered residual cubes corresponding to one and the other of the two acquisition campaigns.

20. Method according to claim 18, characterised in that it consists of determining, for at least one of the acquisition campaigns, a cube that is the sum, for all of the offset and/or angle of incidence values, of the cubes that correspond to the components common to the two acquisition campaigns, and filtered residual cubes corresponding to said acquisition campaign.

21. Method according to claim 18, characterised in that it consists of determining, for at least one of the acquisition campaigns, for each offset and/or angle of incidence value, a filtered cube that is the sum of the cube that corresponds to the component common to the two acquisition campaigns for said offset and/or angle of incidence value and a residual cube that is a function of one or more filtered residual cubes determined for the offset and/or angle of incidence value and at least one adjacent offset and/or angle of incidence value.

* * * * *

UNITED STATES PATENT AND TRADEMARK OFFICE
CERTIFICATE OF CORRECTION

PATENT NO. : 7,720,607 B2  Page 1 of 1
APPLICATION NO. : 10/554966
DATED : May 18, 2010
INVENTOR(S) : Didier Lecerf It is certified that error appears in the above-identified patent and that said Letters Patent is hereby corrected as shown below:

Col. 9, Line 61,
Claim 1, line 4: "...associated with a given position on the around zone over..." should read "...associated with a given position on the ground zone over..."

Col. 10, Line 43,
Claim 7, line 3: "...convened by associating it respectively..." should read "...converted by associating it respectively..."

Signed and Sealed this

Twenty-eighth Day of September, 2010

David J. Kappos
*Director of the United States Patent and Trademark Office*